United States Patent
Izenson et al.

(10) Patent No.: US 7,100,628 B1
(45) Date of Patent: Sep. 5, 2006

(54) ELECTROMECHANICALLY-ASSISTED REGULATOR CONTROL ASSEMBLY

(75) Inventors: Michael G. Izenson, Hanover, NH (US); Patrick J. Magari, Plainfield, NH (US)

(73) Assignee: Creare Inc., Hanover, NH (US)

( * ) Notice: Subject to any disclaimer, the term of this patent is extended or adjusted under 35 U.S.C. 154(b) by 357 days.

(21) Appl. No.: 10/718,273

(22) Filed: Nov. 18, 2003

(51) Int. Cl.
*G05D 16/20* (2006.01)
*A62B 18/10* (2006.01)

(52) U.S. Cl. .................. 137/14; 137/487.5; 137/908; 128/205.24; 128/201.28; 251/26; 251/129.03

(58) Field of Classification Search ............. 137/14, 137/118.06, 487.5, 908; 251/26, 129.03; 128/201.27, 201.28, 204.26, 205.24, 207.12
See application file for complete search history.

(56) References Cited

U.S. PATENT DOCUMENTS

| | | | |
|---|---|---|---|
| 3,039,481 A | 6/1962 | Schreiber et al. | |
| 3,556,098 A | 1/1971 | Kanwisher | |
| 3,957,044 A | 5/1976 | Fletcher et al. | |
| 4,141,354 A * | 2/1979 | Ismach | 128/204.28 |
| 4,285,339 A | 8/1981 | McIntyre | |
| 4,336,590 A | 6/1982 | Jacq et al. | |
| 4,640,277 A | 2/1987 | Meyer et al. | |
| 4,658,858 A | 4/1987 | Beale | |
| 4,793,340 A | 12/1988 | Ottestad | |
| 4,827,964 A * | 5/1989 | Guido et al. | 137/81.1 |
| 4,850,345 A * | 7/1989 | Jackson | 128/202.27 |
| 5,000,174 A | 3/1991 | Gray et al. | |
| 5,156,145 A * | 10/1992 | Flood et al. | 128/201.24 |
| 5,271,390 A | 12/1993 | Gray et al. | |
| 6,000,396 A * | 12/1999 | Melker et al. | 128/204.21 |
| 6,016,802 A * | 1/2000 | Jackson | 128/205.25 |
| 6,206,003 B1 * | 3/2001 | Burch | 128/206.21 |
| 2002/0162553 A1 * | 11/2002 | Hamilton et al. | 128/204.18 |

FOREIGN PATENT DOCUMENTS

GB 2 154 887 A * 9/1985

* cited by examiner

*Primary Examiner*—Ramesh Krishnamurthy
(74) *Attorney, Agent, or Firm*—Down Rachlin Martin PLLC

(57) ABSTRACT

An electromechanically-assisted control system for use in a second-stage regulator. Regulator control assembly (20), also referred to as EMA assembly (20), includes a mechanical actuator sub-assembly (21) and an electromechanical actuator (EMA) sub-assembly (22) for controlling airflow through single air supply line (23). EMA sub-assembly (22) includes electronically controllable actuator (ECA) (34), which removably seals EMA orifice (36) in wall (30) of pilot chamber (32). ECA (34) is electrically connected with and controlled by control electronics (38). The control electronics include programmable microprocessor (40), which is electrically connected with charge and discharge electronics (42), both of which are electrically connected with power supply (44). Alternatively, regulator control assembly (20'), also referred to as all-electronic (AE) assembly (20'), has only an EMA sub-assembly and no mechanical actuator sub-assembly. AE assembly (20') does not include a low-pressure diaphragm, a lever arm, a first valve, or a pilot jet orifice.

16 Claims, 6 Drawing Sheets

ELECTROMECHANICALLY-ASSISTED REGULATOR CONTROL ASSEMBLY

STATEMENT OF GOVERNMENT RIGHTS

This invention was made with Government support under Grant No. 2 R44 HL58284-02 awarded by the National Heart, Lung and Blood Institute. The Government may have certain rights in the invention.

FIELD OF THE INVENTION

The present invention is generally related to the field of second-stage regulators for use in a self-contained breathing apparatus (SCBA). More particularly, the present invention is directed to an electromechanically-assisted control assembly for use in a second-stage regulator.

BACKGROUND OF THE INVENTION

There are millions of SCBA users in the United States alone, including firefighters, rescue workers, and hazardous materials workers. SCBAs are worn in hazardous environments over 100 million times each year. SCBAs provide clean breathing air on demand and maintain a positive pressure in the facepiece, protecting the user from toxic gases and aerosols in the environment.

Prior art SCBA regulators can be slow to respond to very rapid breathing transients. As a result, there is a potential to "over breathe" the regulator, which reduces the facepiece pressure below the ambient pressure and potentially allows toxic gases to leak in from the environment.

Another shortcoming of prior art regulators results from the fact that many use a purely mechanical design. Purely mechanical designs may cause a number of dynamic stability issues under certain conditions. As a result, it is often difficult to set the nominal static facepiece pressure, i.e., exhalation pressure, to a low value. Conventional SCBAs have a nominal exhale pressure of approximately 2 or 3 inches of water pressure over the ambient. The relatively large exhalation pressure is typically very noticeable to a wearer and adds to the breathing work.

SUMMARY OF INVENTION

In one aspect, the present invention is directed to a regulator control assembly for use in a second-stage regulator having a pressure-sensitive valve for coupling and decoupling a single air supply line with a SCBA facepiece. The regulator control assembly includes a mechanical actuator sub-assembly and an electromechanical actuator sub-assembly. The mechanical actuator sub-assembly and the electromechanical actuator sub-assembly are each adapted to actuate the pressure-sensitive valve.

In another aspect, the present invention is directed a regulator control assembly for use in a second-stage regulator. The regulator control assembly includes a pilot chamber, a single air supply line used to supply air to a SCBA facepiece, a mechanical actuator sub-assembly for depressurizing the pilot chamber, and an electromechanical actuator sub-assembly for depressurizing the pilot chamber.

In a further aspect, the present invention is directed to a regulator control assembly for use in a second-stage regulator having a pressure-sensitive valve controlling a single air supply line. The regulator control assembly includes first means for actuating the pressure-sensitive valve. The first means includes a mechanically actuated element. The regulator control assembly also includes second means for actuating the pressure-sensitive valve. The second means include an electromechanically actuated element.

In yet another aspect, the present invention is directed to a method of controlling a second-stage regulator single air supply line used to supply air to a SCBA facepiece using both mechanical and electromechanical actuators. The method includes the following steps: providing a mechanical actuator for controlling the single air supply line; determining the pressure in the facepiece; determining the rate of pressure change in the facepiece; comparing the pressure in the facepiece to a predetermined pressure; comparing the rate of pressure change in the facepiece to a predetermined rate of pressure change; activating or deactivating the electromechanical actuator if the pressure in the facepiece is lower than the predetermined pressure; and activating or deactivating the electromechanical actuator if the rate of pressure change in the facepiece is higher than the predetermined rate of pressure change.

In a further aspect, the present invention is directed to a regulator control assembly for use in a second-stage regulator having a pressure-sensitive valve controlling a single air supply line for supplying air to a SCBA facepiece. The regulator control assembly includes an electromechanical actuator sub-assembly adapted to actuate the pressure-sensitive valve. The regulator control assembly has no mechanical actuator sub-assembly.

In another aspect, the present invention is directed a regulator control assembly for use in a second-stage regulator having a pilot chamber and a single air supply line for supplying air to a SCBA facepiece. The regulator control assembly includes an electromechanical actuator sub-assembly for depressurizing the pilot chamber. The regulator control assembly has no mechanical actuator sub-assembly.

In yet another aspect, the present invention is directed to a method of controlling a second-stage regulator single air supply line used to supply air to a SCBA facepiece using only an electromechanical actuator. The method includes the following steps: determining the facepiece pressure; determining the rate of facepiece pressure change; determining the actual electromechanical actuator voltage; finding the difference between the facepiece pressure and a predetermined desired facepiece pressure to obtain an error signal; multiplying the error signal by a fixed gain to obtain a proportional error signal; inverting and multiplying the facepiece rate of pressure change by a predetermined constant to obtain an output; and adding the proportional error signal to the output from the inverting and multiplying step to obtain a desired electromechanical actuator voltage; charging or discharging the electromechanical actuator if the actual electromechanical actuator voltage is lower than the desired electromechanical voltage; and charging or discharging the electromechanical actuator if the actual electromechanical actuator voltage is higher than the desired eletromechanical voltage.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE INVENTION

The present invention is directed to an electromechanically-assisted and an all-electronic control system for use in a second-stage regulator. The present invention includes a regulator control assembly, a method of using the assembly, and a method of adding the assembly to prior art regulators. Examples of the disclosed invention are depicted in FIGS. 1–6, although it should be understood that the present invention is not limited to this (or any other) particular embodiment, but rather is intended to cover all assemblies and methods that fairly fall within the broad scope of the appended claims.

Figure 1:
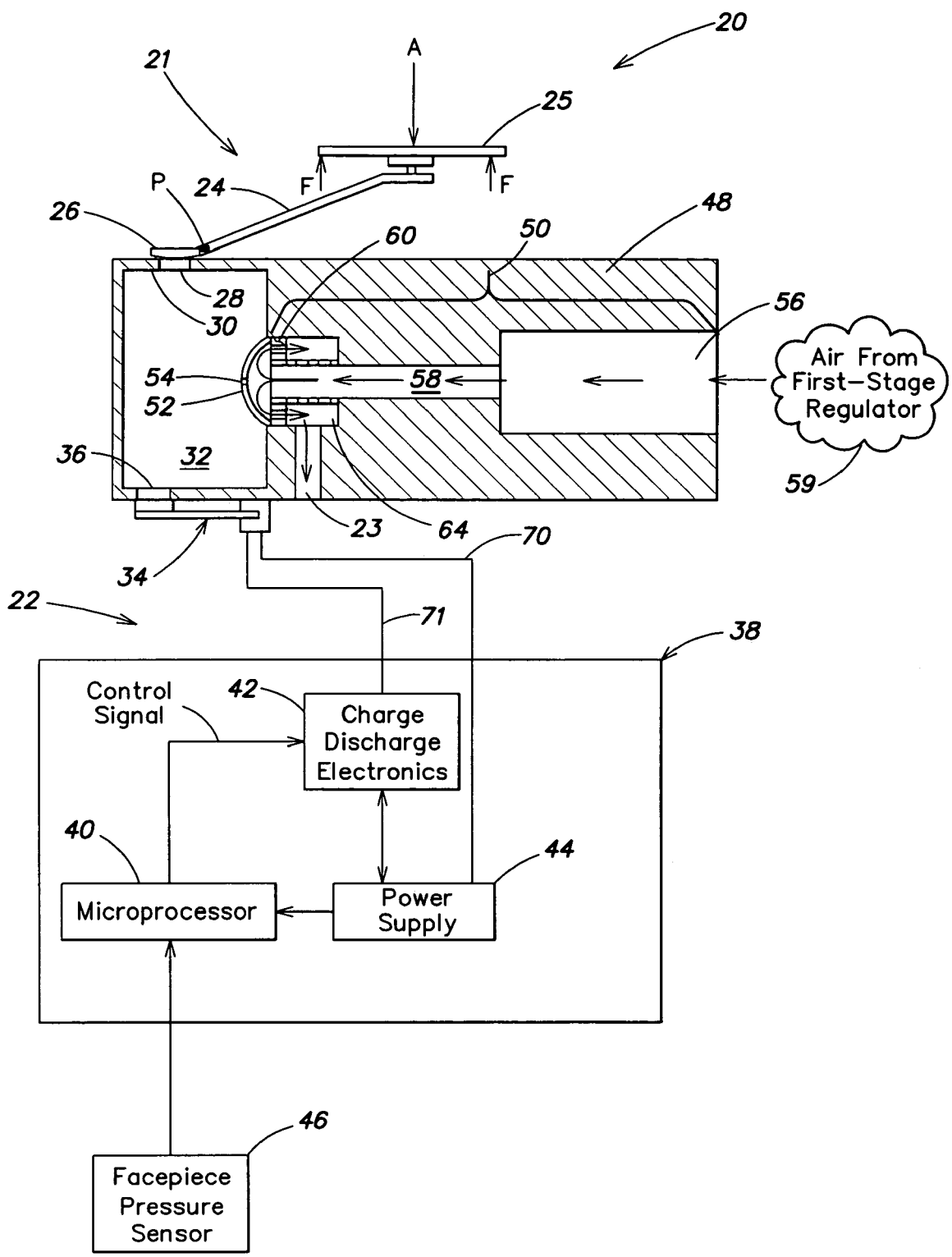
FIG. 1 is a cross-sectional view of a regulator control assembly having an electromechanical actuator sub-assembly and a schematic diagram of a control system for controlling the assembly according to one embodiment of the present invention.

Referring now to the drawings, FIG. 1 is a cross-sectional and partially schematic diagram of a regulator control assembly 20 for use in a SCBA second-stage regulator (not shown). Regulator control assembly 20, includes both mechanical actuator sub-assembly 21 and electromechanical actuator (EMA) sub-assembly 22 for controlling airflow through a single air supply line 23 that leads to the SCBA facepiece. Regulator control assembly 20 is also referred to as EMA assembly 20. The mechanical actuator sub-assembly includes a lever arm 24 that is connected to a low-pressure diaphragm 25 and first valve 26. First valve 26 removably resides within a pilot jet orifice 28 formed in a wall 30 of a pilot chamber 32. Lever arm 24 is pivotally mounted to structure (not shown) at pivot point P (not shown) or some other component to hold first valve 26 in a first position where orifice 28 is blocked thereby maintaining a positive pressure in the facepiece. Multiple forces act on diaphragm 25. A force A, i.e., ambient air pressure, acts on the side of diaphragm 25 opposite the SCBA facepiece (not shown) and a force F, i.e., the air pressure within the facepiece, acts on the facepiece side of the diaphragm (via passages not shown in FIG. 1). An additional bias force, S, is applied to the diaphragm by a spring that acts in the same direction as the force from ambient air, A. If the sum of forces A and S becomes greater than force F, then diaphragm 25 moves downwardly on lever arm 24 thereby causing the lever arm to move in a clockwise motion around pivot point P in FIG. 1. This movement of lever arm 24 moves first valve 26 to a second position where the first valve no longer blocks orifice 28.

The EMA sub-assembly 22 includes an electronically controllable actuator (ECA) 34, which selectively seals or unseals an EMA orifice 36 in wall 30 of pilot chamber 32. In one embodiment, a multi-layer, bender type, piezoelectric actuator, e.g., part number PL 122.251 as manufactured by Polytec of Auburn, Mass. is used. As one skilled in the art will appreciate, myriad other ECAs may be used in place of a piezoelectric ECA.

ECA 34 is electrically connected with and controlled by control electronics 38. Control electronics 38 include a programmable microprocessor 40, which is electrically connected with charge and discharge electronics 42, both of which are electrically connected with a power supply 44. Microprocessor controls charge and discharge electronics 42, which in turn causes power supply 44 to charge or discharge ECA 34. In one embodiment, a model P1C16LC716 microprocessor as manufactured by Microchip of Chandler, Ariz. is used. Of course, any logic device capable of achieving the functions described below may also be used. Power supply 44 is also electrically connected with ECA 34. In one embodiment, power supply 44 includes two "CR2" 3V lithium batteries. In addition, if necessary, a high voltage boost converter may be employed to provide sufficient voltage to ECA 34.

The EMA sub-assembly 22 also includes a facepiece pressure sensor 46 that is in electrical communication with microprocessor 40. In one embodiment, facepiece pressure sensor 46 is a solid-state pressure transducer, e.g., model CPCL04GFC as manufactured by Honeywell of New York, N.Y.

Control regulator assembly 20 may be originally manufactured to include mechanical sub-assembly 21 and EMA sub-assembly 22, or may originally be a regulator assembly having only a mechanical sub-assembly that is modified to include an EMA sub-assembly. Assembly 20 includes a body portion 48 having an air supply conduit 50. Pilot chamber 32, also formed in body portion 48, and air supply conduit 50 are separated by a flexible high-pressure diaphragm 52 or other pressure-sensitive valve and are in fluid communication, i.e., via a pressure equalization orifice 54 in the diaphragm. Air supply conduit 50 includes an air supply receiver chamber 56 and an air supply channel 58, which are in fluid communication. Chamber 56 is connected on one end to a supply of air 59 from a first stage regulator (not shown). Air supply channel 58 is further in fluid communication with an annular air supply port 60 when high pressure diaphragm 52 is "open", i.e. pushed away from the supply port toward pilot chamber 32. Air supply port 60 is in fluid communication with air supply line 23 that supplies air to a SCBA facepiece (not shown) via an annular air supply outlet chamber 64. Air supply port 60 may be a single annular port or a group of ports arranged in a circular configuration.

Figure 2:
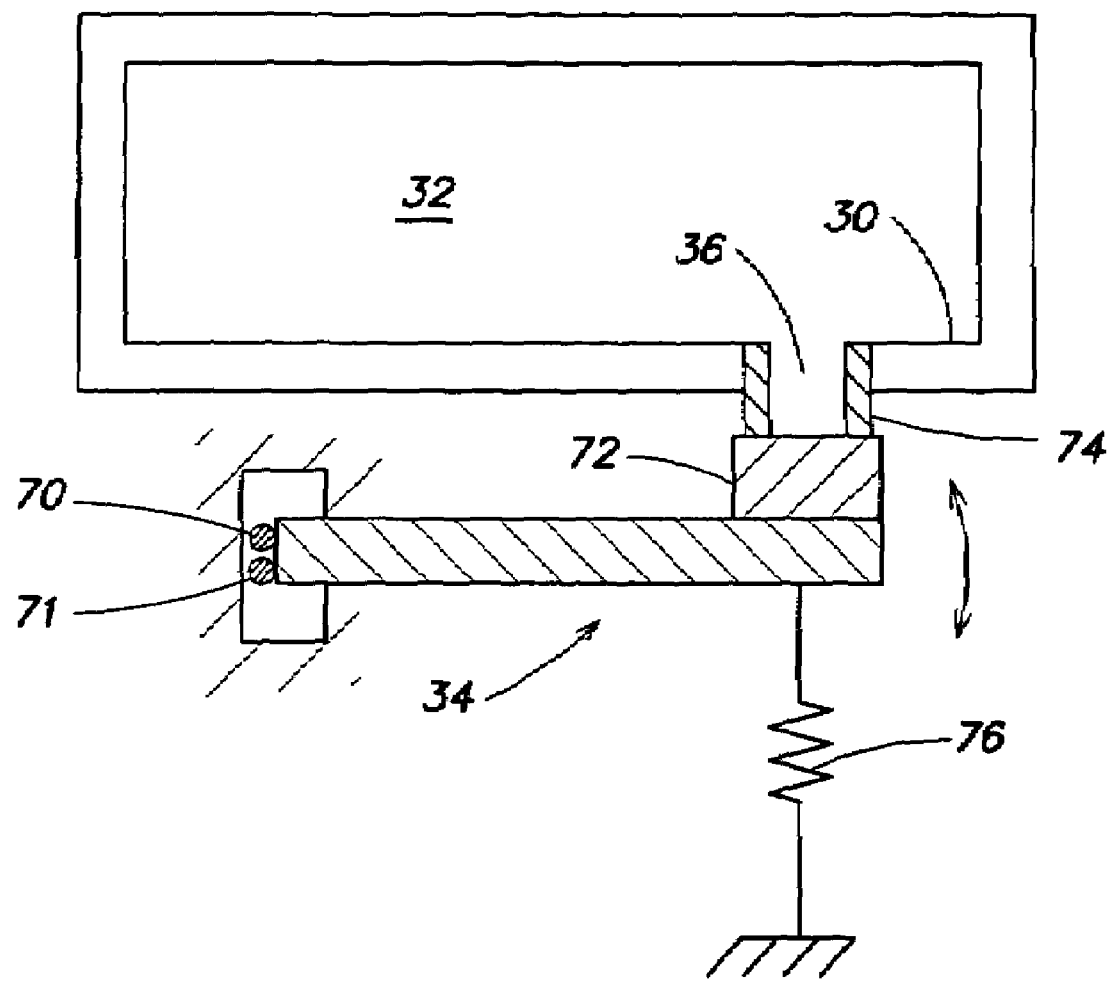
FIG. 2 is an enlarged section view of an electromechanical actuator according to one embodiment of the present invention.

Referring now to FIG. 2, an enlarged simplified, partial cross-sectional diagram of ECA 34 is illustrated. Power discharge lead 70 and power charge lead 71 are joined with one end of ECA 34 and a rubber seal 72 is attached to the opposite end. Rubber seal 72 removably seals a valve seat 74 that protrudes from EMA orifice 36 in wall 30 of pilot chamber 32. A bias spring 76 is joined with ECA 34 on a surface opposite valve seat 74. Bias spring 76 is selected to press rubber seal 72 against EMA orifice 36 with sufficient force to seal the orifice when actuator 34 is not actuated, as described in more detail below.

In operation, EMA assembly 20 operates in cycles. Each cycle begins when a user inhales and terminates when a user exhales. When a user wearing a SCBA including a facepiece and second-stage regulator having EMA assembly 20 inhales, the pressure inside the facepiece decreases. Because, as explained above, the inside of the facepiece is in fluid communication with one side of low-pressure diaphragm 25 (FIG. 1), pressure F on that side of the diaphragm also decreases. In turn, ambient pressure A, which is now greater than pressure F and bias spring force S, forces the diaphragm to move toward body portion 48. As a result, lever arm 24 and first valve 26 are also caused to pivot thereby opening pilot jet orifice 28. The combined dynamic response of diaphragm 25 and lever arm 24 limit the ability of prior art regulators to respond quickly to rapid breathing transients. After pilot jet orifice 28 is opened, the high-pressure air in pilot chamber 32 quickly exits pilot jet orifice 28 thereby depressurizing pilot chamber 32 and causing high-pressure flexible diaphragm 52 to move to the left, away from port 60, under the force of the pressure from supply of air 59 in air supply conduit 50. As a result and as indicated by the directional arrows in FIG. 1, this movement of diaphragm 52 uncovers air supply port 60 thereby allowing air 59 from the first-stage regulator (not shown) to flow from air supply channel 58, through port 60, into outlet chamber 64, and finally to air supply line 23 and into the SCBA facepiece (not shown).

When the user stops inhaling, the pressure in the facepiece rises above the ambient pressure thereby causing low-pressure diaphragm 25 to move to its original position. As diaphragm 25 moves, it causes lever arm 24 and first valve 26 to pivot around pivot point P, i.e., in a counterclockwise motion in FIG. 1, thereby driving the first valve into contact with pilot jet orifice 28 so as to reseal the orifice. Then, pilot chamber 32 is re-pressurized from supply of air 59 entering via pressure equalization orifice 54. This change in pressure allows high-pressure flexible diaphragm 52 to move back to the right, thereby resealing air supply port 60, which in turn cuts off the flow of air supply to the facepiece. At this time, i.e., before the next cycle begins, the pressure in pilot chamber 32 is equal to the pressure of the air supply in air supply conduit 50, i.e., approximately 100 psia. As mentioned above, high-pressure flexible diaphragm 52 separates pilot chamber 32 from air supply conduit 50. However, pressure equalization orifice 54 in high-pressure diaphragm 52 allows the pressure between pilot chamber 32 and air supply conduit 50 to temporarily equalize before the next cycle begins.

In addition to the mechanical actuator sub-assembly 21 and all of the other mechanical components described above, as mentioned previously, EMA assembly 20 also includes an EMA sub-assembly 22. As part of the EMA sub-assembly 22, facepiece pressure sensor 46 monitors the difference between the facepiece and ambient pressures. As explained in detail below, facepiece pressure sensor 46 continually feeds a signal indicating the facepiece pressure to microprocessor 40. Microprocessor 40 compares the facepiece pressure to a predetermined value. If the facepiece pressure is below the predetermined value, as explained in greater detail below, microprocessor 40 causes ECA 34 to open EMA orifice 36. In turn, pilot chamber 32 is de-pressurized allowing high-pressure diaphragm 52 to move to the left and open air supply port 60. As a result, air flows to the user. The EMA sub-assembly 22 allows EMA assembly 20 to respond more quickly, i.e., provide additional air supply to a user, to predetermined facepiece pressure conditions, i.e., low pressure conditions, than a regulator control assembly including only a mechanical actuator sub-assembly 21. In this way, the EMA assembly prevents overbreathing.

Figure 3:
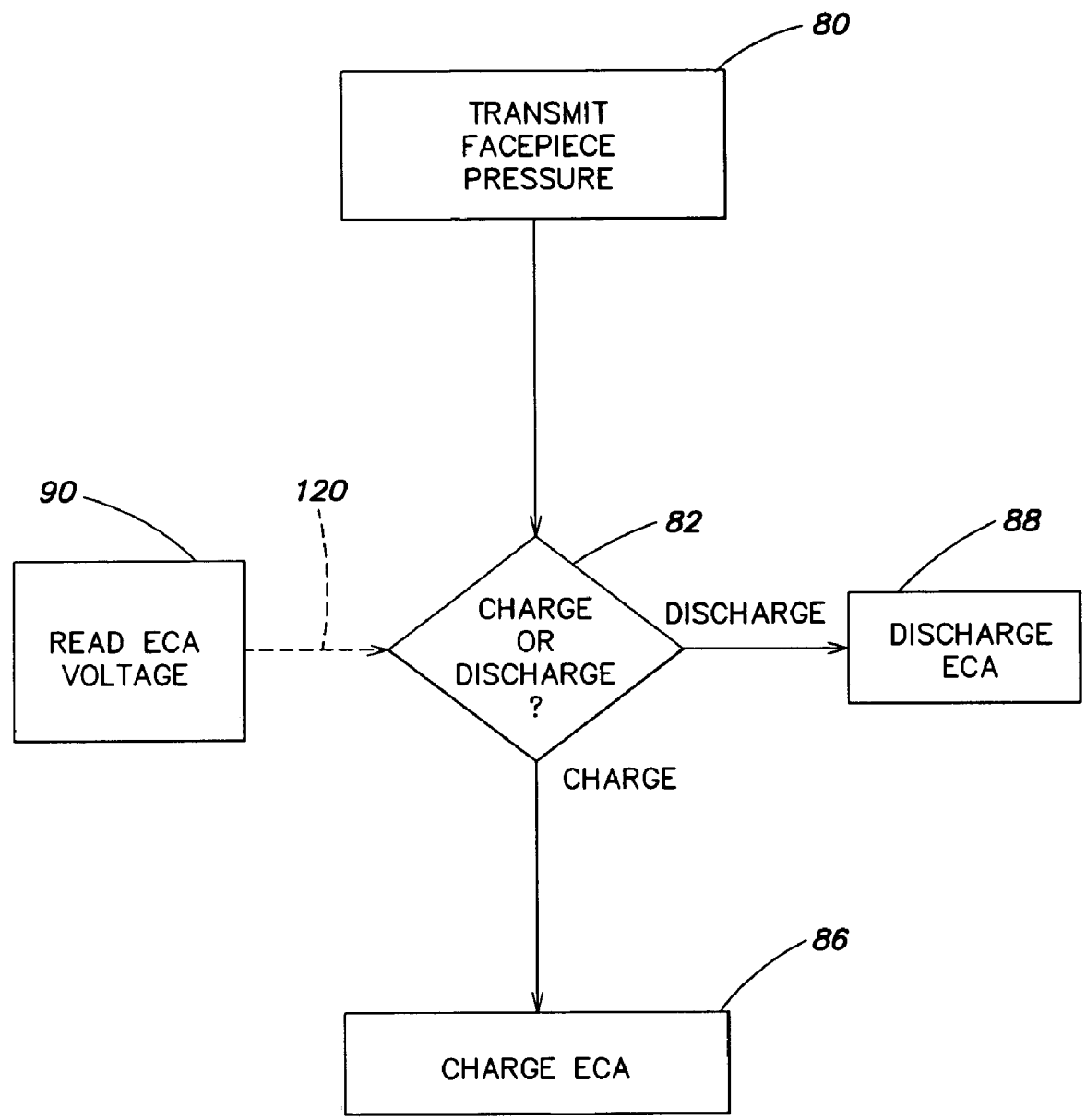
FIG. 3 is a block diagram of the control structure of an electromechanical actuator sub-assembly according to one embodiment of the present invention.

Referring now to FIG. 3, a block diagram of the control methodology for controlling ECA 34 in EMA sub-assembly 22 is illustrated. At step 80, the facepiece pressure at sensor 46 is transmitted to microprocessor 40. Then, at step 82, microprocessor 40 determines whether to cause charge and discharge electronics 42 to charge or discharge ECA 34, i.e., a multi-layer, bender type, piezoelectric actuator in the embodiments described above, based on the control algorithms that compare the desired and actual facepiece pressures. As mentioned above, ECA 34 is electrically connected with and controlled by control electronics 38, which include programmable microprocessor 40 and charge and discharge electronics 42. Next, at step 86, charge and discharge electronics 42 cause ECA 34 to become charged. ECA 34 is charged by supplying voltage to the ECA. If ECA 34 is to be discharged, per the decision at step 82, then ECA 34 is discharged by briefly connecting the ECA to ground through a resistor as indicated by step 88. In FIG. 1, ECA 34 is configured so that it moves away or temporarily opens EMA orifice 36 when it is charged and moves toward or temporarily closes the orifice when discharged. Of course, in other embodiments, charging may cause the ECA to close or temporarily seal the EMA orifice. The dashed line from step 90 to step 82 is related to an alternative embodiment as discussed further below.

Figure 4:
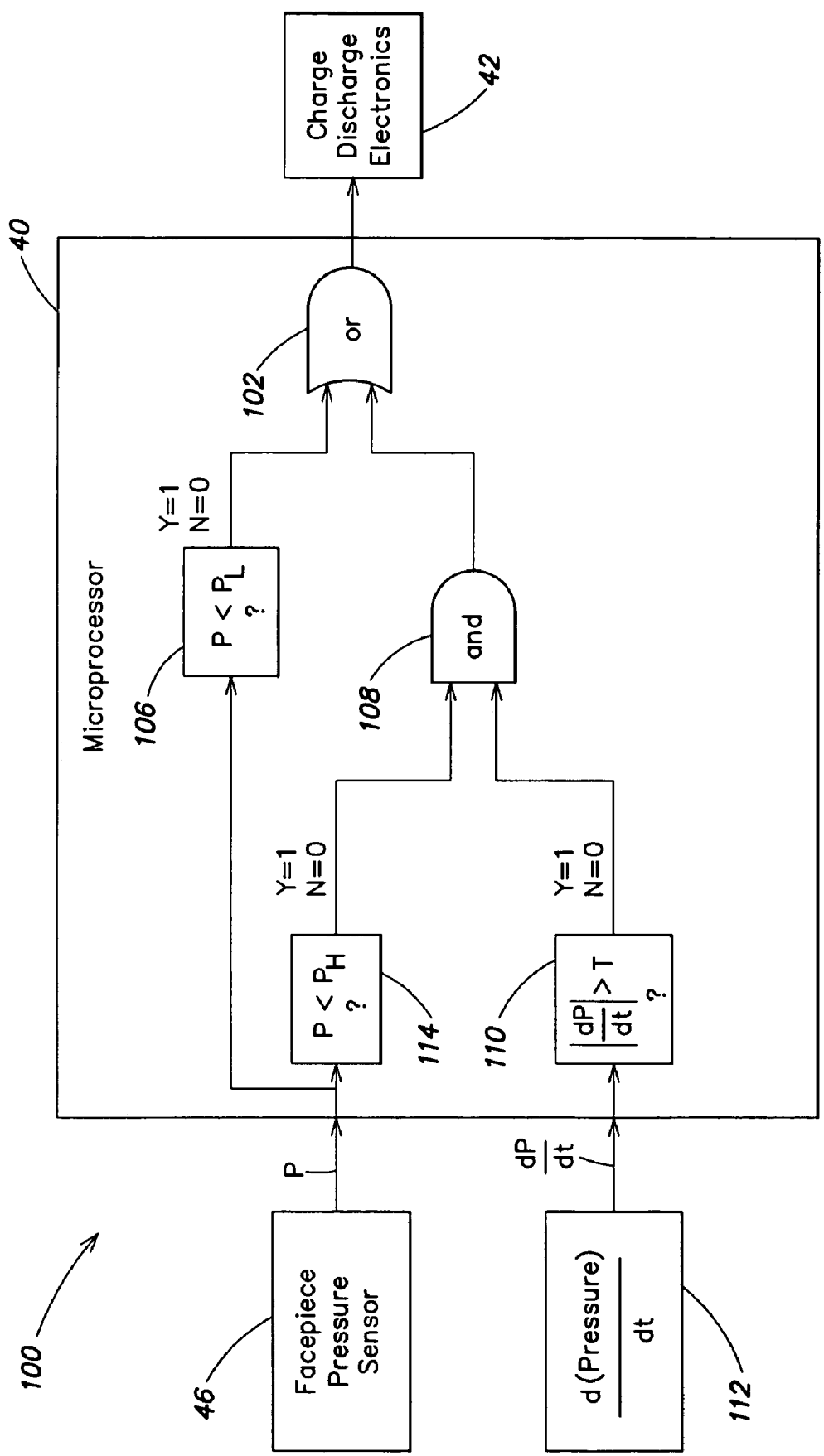
FIG. 4 is a simplified circuit diagram of a control strategy of an electromechanical actuator sub-assembly according to one embodiment of the present invention.

The control algorithms in microprocessor 40 are based on a particular control strategy. FIG. 4 illustrates a control strategy 100 for EMA assembly 20 that is programmed in microprocessor 40. As mentioned above, ECA 34 typically only opens, i.e., unseals, EMA orifice 36 during extreme breathing transients by a user. In addition, depending on the control signal, ECA 34 is either fully charged or discharged, causing EMA orifice 36 to be either fully open or fully closed. As a result, control strategy 100 includes several thresholds that are used to determine whether ECA 34 should be charged or discharged. Output from each threshold is input to a logical "OR" gate 102. As a result, if any input to OR gate 102 is a logic 1, OR gate 102 will output a logic 1 to charge and discharge electronics 42, which causes voltage to be supplied to and thereby charge ECA 34. Conversely, if none of the inputs to OR gate 102 include a logic 1, then OR gate 102 will output a logic 0 to charge and discharge electronics 42, which causes the charge and discharge electronics to discharge ECA 34.

A first input to OR gate 102 is determined at box 106, where if facepiece pressure P (input from facepiece pressure sensor 46) is below some value $P_L$, then a logic 1 is output to OR gate 102 and ECA 34 is ultimately opened. $P_L$ is typically set at 0 inches of water, or some slightly positive value, e.g., 0.1 inches of water. A second input to OR gate 102 is determined at AND gate 108. AND gate 108 includes two inputs. The first of the two inputs to AND gate 108 is determined at box 110, where if a rate of change of facepiece pressure 112, i.e., |dP/dt|, is larger than some threshold value T, a logic value 1 is output to AND gate 108. The magnitude of the time derivative of the pressure signal, i.e., |dP/dt|, is either calculated in microprocessor 40 or generated via analog circuitry. The latter is illustrated in FIG. 4. T is typically set at 75.0 inches of water per second. The second of the two inputs to AND gate 108 is determined at box 114. To achieve a level of noise reduction, if facepiece pressure P exceeds some value, $P_H$, a logic value 0 is output to AND gate 108. $P_H$ is typically set at approximately 1.0 inch of water. If both inputs to AND gate 108 are equal to logic value 1, then AND gate 108 will output a logic value 1 to OR gate 102, causing ECA 34 to be charged. In summary, if OR gate 102 outputs a logic 1 value, ECA 34 is ultimately charged and opened and if OR gate 102 outputs a logic 0 value, ECA 34 is ultimately discharged and closed.

Figure 5:
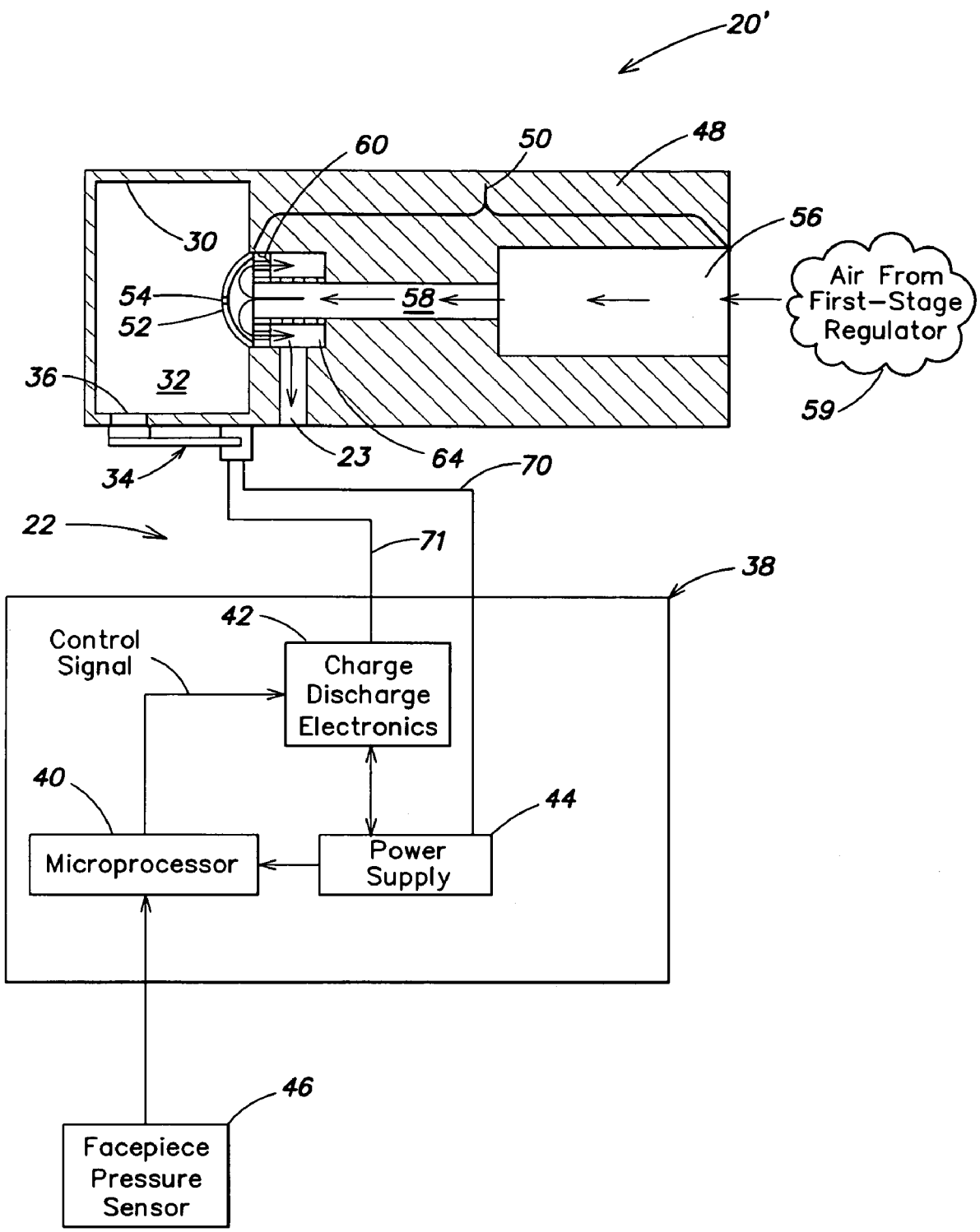
FIG. 5 is a cross-sectional view of a regulator control assembly having an all-electronic actuator sub-assembly according to one embodiment of the present invention.

Referring now to FIG. 5, where like elements are numbered the same as corresponding elements in FIGS. 1 and 2, an alternative regulator control assembly 20' having only an EMA sub-assembly 22 and no mechanical actuator sub-assembly 21, also referred to as all-electronic (AE) assembly 20', is illustrated. Structurally, EMA assembly 20 and AE assembly 20' only differ in that AE assembly 20' does not include lever arm 24, low-pressure diaphragm 25, first valve 26, or pilot jet orifice 28, i.e., the elements that form the mechanical actuator sub-assembly 21. However, both the control structure and strategy for AE assembly 20' differ from those of EMA assembly 20.

Referring again to FIG. 3, the control structure for controlling ECA 34 in EMA assembly 20 is the same for controlling ECA 34 in AE assembly 20', with the exception of a feedback loop 120. At step 90, the actual voltage of ECA 34 is transmitted via feedback loop 120 to microprocessor 40. As explained further with respect to FIG. 6, the voltage of ECA 34 indicates the position of ECA 34 thereby facilitating proportional control and modulation of the air supply flow into the facepiece by microprocessor 40.

Figure 6:
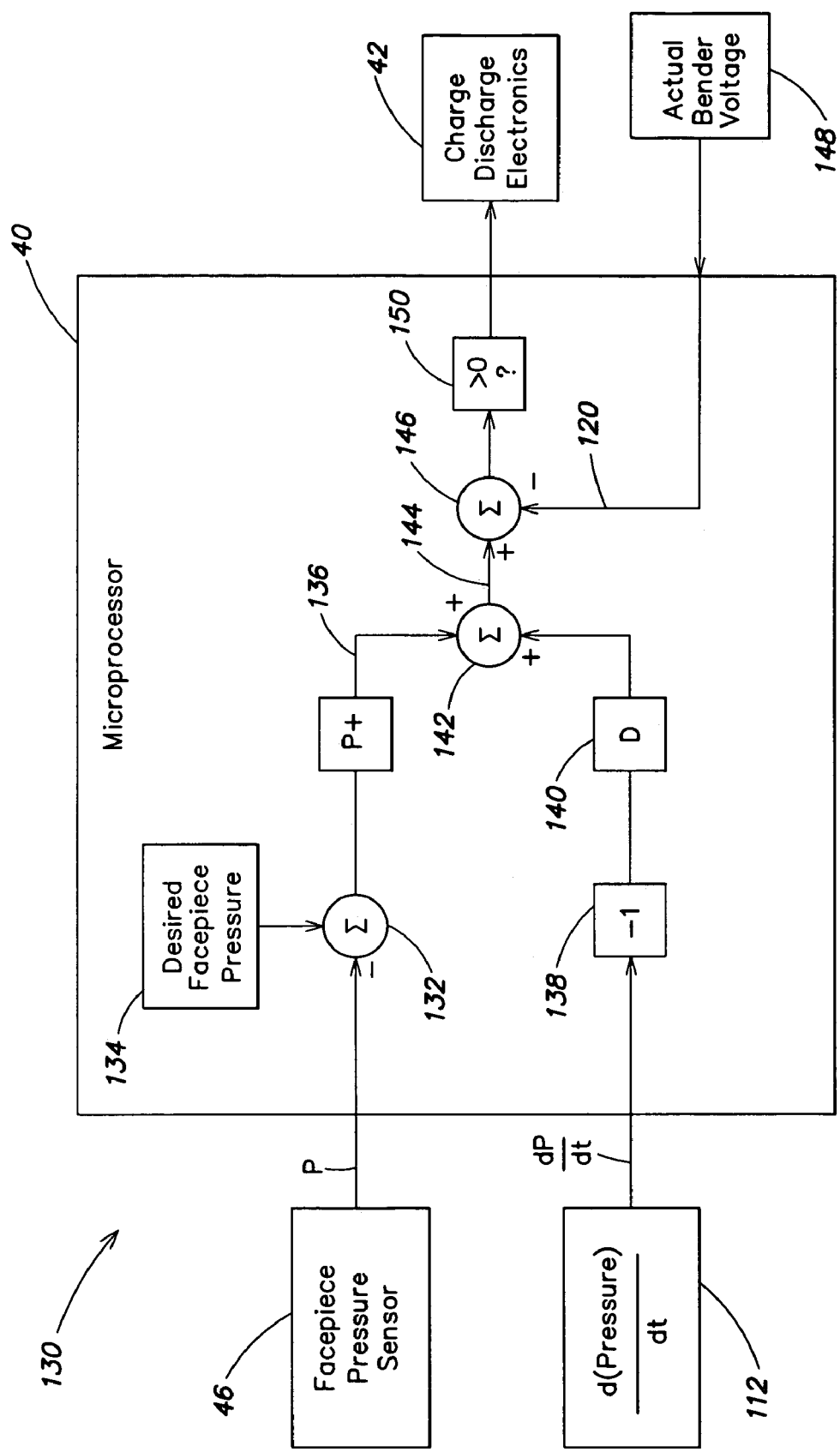
FIG. 6 is a simplified circuit diagram of a control strategy of an all-electronic actuator sub-assembly according to one embodiment of the present invention.

FIG. 6 illustrates a control strategy 130 for AE assembly 20' and ECA 34 that is programmed in microprocessor 40. Facepiece pressure sensor 46 sends facepiece pressure P to a pressure comparison module 132. Facepiece pressure P is compared with a fixed reference, i.e., a desired facepiece pressure 134 that is programmed in pressure comparison module 132. Pressure comparison module 132 produces an error signal that is multiplied by a fixed gain P+ to produce a proportional error signal 136. As in FIG. 4, in the embodiment illustrated in FIG. 6, the time derivative of the pressure signal, i.e., dP/dt, is used as input to the algorithms performed by microprocessor 40. In other embodiments, the time derivative of the pressure signal, i.e., dP/dt, may not be used as an input to microprocessor 40. As one skilled in the art appreciates, while use of dP/dt provides a faster response for rapid breathing transients, it also adds noise to the system and increases overall power consumption. Therefore, inclusion of dP/dt is based on the particular use requirements of the regulator.

The time derivative of the pressure signal is first inverted at box 138 and then multiplied by a constant D at box 140. Both proportional error signal 136 and the output from box 140 are summed at commanded voltage module 142. A desired ECA voltage 144 is output from commanded voltage module 142 to a voltage comparison module 146. An actual ECA voltage 148 is transferred to voltage comparison module 146 via voltage feedback loop 120 for comparison to desired ECA voltage 144. At box 150, it is determined whether desired ECA voltage 144 is greater than or less than actual ECA voltage 148. If greater, microprocessor 40 causes a logic 0 to be output to charge and discharge electronics 42, which causes the charge/discharge electronics to discharge ECA 34. If less, microprocessor 40 causes a logic 1 to be output to the ECA driver, which causes the charge discharge electronics to charge ECA 34.

The electromechanical actuator assembly maintains all the conventional diaphragm-driven mechanical components and includes an electronically controllable actuator that augments the mechanical system. A regulator including the EMA assembly is more responsive to extreme breathing transients and more able to maintain positive pressure in a facepiece for extreme breathing rate transients. In addition, a regulator having an EMA assembly eliminates the negative facepiece pressure excursion often experienced by conventional mechanical regulators at about 50 ms after the start of a rapid breath.

The all-electronic assembly eliminates the original diaphragm-driven components. This approach provides at least two benefits. First, the overall regulator design is simpler and more compact. Second, a regulator including the AE assembly uses microprocessor feedback control, which provides a great deal of flexibility in establishing control stability compared to a purely mechanical system. As a result, the static pressure in the facepiece of a system with a regulator having an AE assembly can be set at a lower value than in a conventional mechanical regulator. Reduced pressure reduces the breathing work and improves comfort.

While the present invention has been described in connection with a preferred embodiment, it will be understood that it is not so limited. On the contrary, it is intended to cover all alternatives, modifications and equivalents as may be included within the spirit and scope the invention as defined above and in the claims appended hereto.

What is claimed is:

1. A regulator control assembly for use in a second-stage regulator having a pressure-sensitive valve for coupling and decoupling a single air supply line with a SCBA facepiece, comprising:
   a mechanical actuator sub-assembly; and
   an electromechanical actuator sub-assembly;
   wherein said mechanical actuator sub-assembly and said electromechanical actuator sub-assembly are each adapted to actuate the pressure-sensitive valve.

2. A regulator control assembly according to claim 1, wherein said electromechanical actuator sub-assembly includes a programmable microprocessor.

3. A regulator control assembly according to claim 2, wherein said electromechanical actuator sub-assembly includes means for sensing pressure in the facepiece and providing a signal to said microprocessor that varies as a function of changes in said pressure.

4. A regulator control assembly according to claim 3, wherein said means for sensing a pressure includes a pressure transducer.

5. A regulator control assembly according to claim 1, wherein said electromechanical actuator sub-assembly includes a piezoelectric actuator.

6. A regulator control assembly for use in a second-stage regulator, comprising:
   a pilot chamber;
   a single air supply line used to supply air to a SCBA facepiece;
   a mechanical actuator sub-assembly for depressurizing the pilot chamber; and
   an electromechanical actuator sub-assembly for depressurizing the pilot chamber.

7. A regulator control assembly according to claim 6, wherein said electromechanical actuator sub-assembly includes a programmable microprocessor.

8. A regulator control assembly according to claim 7, wherein said electromechanical actuator sub-assembly includes means for sensing pressure in the facepiece and providing a signal to said microprocessor that varies as a function of changes in said pressure.

9. A regulator control assembly according to claim 8, wherein said means for sensing pressure includes a pressure transducer.

10. A regulator control assembly according to claim 6, wherein said electromechanical actuator sub-assembly includes a piezoelectric actuator.

11. A regulator control assembly for use in a second-stage regulator having a pressure-sensitive valve controlling a single air supply line, comprising:
    first means for actuating the pressure-sensitive valve, said first means including a mechanically actuated element; and second means for actuating the pressure-sensitive valve, said second means including an electromechanically actuated element.

12. A regulator control assembly according to claim 11, wherein said second means includes a programmable microprocessor.

13. A regulator control assembly according to claim 11, wherein said second means includes a piezoelectric actuator.

14. A method of controlling a second-stage regulator single air supply line used to supply air to a SCBA facepiece using both mechanical and electromechanical actuators, comprising the steps of:
- providing a mechanical actuator for controlling the single air supply line;
- determining the pressure in the facepiece;
- determining the rate of pressure change in the facepiece;
- comparing the pressure in the facepiece to a predetermined pressure;
- comparing the rate of pressure change in the facepiece to a predetermined rate of pressure change;
- activating or deactivating the electromechanical actuator if the pressure in the facepiece is lower than the predetermined pressure; and
- activating or deactivating the electromechanical actuator if the rate of pressure change in the facepiece is higher than the predetermined rate of pressure change.

15. A method according to claim 14, wherein said comparing steps are performed using a programmable microprocessor.

16. A method of modifying a second-stage regulator having a pilot chamber and a mechanically controlled single air supply line for supplying air to a SCBA facepiece to allow for electromechanical control of the single air supply line, comprising the steps of:
- adding an orifice to the pilot chamber;
- providing an electronically controlled actuator for sealing and unsealing said orifice;
- adding means for sensing the pressure inside the facepiece; and
- adding control means for activating and deactivating said electronically controlled actuator based at least partially on the pressure inside the facepiece.

* * * * *